United States Patent
Lee et al.

(10) Patent No.: US 9,877,222 B2
(45) Date of Patent: Jan. 23, 2018

(54) MOBILE COMMUNICATION SYSTEM, DIGITAL UNIT, AND METHOD OF ESTABLISHING JOINT TRANSMISSION AREA IN THE SYSTEM

(71) Applicant: KT CORPORATION, Gyeonggi-do (KR)

(72) Inventors: Ki-Ho Lee, Gyeonggi-do (KR); Yong-Gyoo Lee, Seoul (KR); Yung-Ha Ji, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 210 days.

(21) Appl. No.: 14/652,320

(22) PCT Filed: Sep. 2, 2013

(86) PCT No.: PCT/KR2013/007910
§ 371 (c)(1),
(2) Date: Jun. 15, 2015

(87) PCT Pub. No.: WO2014/098349
PCT Pub. Date: Jun. 26, 2014

(65) Prior Publication Data
US 2015/0304881 A1 Oct. 22, 2015

(30) Foreign Application Priority Data
Dec. 18, 2012 (KR) .......................... 10-2012-0148786

(51) Int. Cl.
*H04W 28/02* (2009.01)
*H04B 7/04* (2017.01)
(Continued)

(52) U.S. Cl.
CPC ........... *H04W 28/0226* (2013.01); *H04L 5/00* (2013.01); *H04L 25/03891* (2013.01);
(Continued)

(58) Field of Classification Search
None
See application file for complete search history.

(56) References Cited

U.S. PATENT DOCUMENTS 6,728,554 B1 * 4/2004 Wegner .................. H01Q 1/246
342/373
8,842,615 B1 * 9/2014 Kalbag ............. H04W 72/0486
370/329
(Continued)

FOREIGN PATENT DOCUMENTS

| KR | 10-2009-0052773 A | 5/2009 |
| KR | 10-2011-0038994 A | 4/2011 |
| KR | 10-2012-0061881 A | 6/2012 |

*Primary Examiner* — Ayaz Sheikh
*Assistant Examiner* — Tarell Hampton
(74) *Attorney, Agent, or Firm* — IP Legal Services, LLC (57) ABSTRACT

Provided are a mobile communication system, a digital unit, and a method of establishing a joint transmission area in the system. When the digital unit determines that a terminal is located in a joint transmission area based on signal strength values received from two of radio units and transmission powers of the two radio units, the digital unit adjusts the joint transmission area depending on the load on the network including the two radio units belong in order to allow the two radio units to perform a joint transmission function to send at least one of the same signal and a spatiotemporally coded signal of the same data to the terminal.

17 Claims, 7 Drawing Sheets

(51) Int. Cl.
  *H04W 28/08* (2009.01)
  *H04W 72/12* (2009.01)
  *H04B 7/02* (2017.01)
  *H04L 5/00* (2006.01)
  *H04L 25/03* (2006.01)
  *H04B 7/022* (2017.01)

(52) U.S. Cl.
  CPC ..... *H04W 28/085* (2013.01); *H04W 72/1252* (2013.01); *H04B 7/022* (2013.01)

(56) References Cited

U.S. PATENT DOCUMENTS

| | | | |
|---|---|---|---|
| 9,300,450 B2* | 3/2016 | Jongren | H04L 5/0048 |
| 2008/0080414 A1* | 4/2008 | Thubert | H04W 76/022 |
| | | | 370/328 |
| 2008/0102872 A1* | 5/2008 | Liu | H04W 52/40 |
| | | | 455/522 |
| 2008/0214221 A1* | 9/2008 | Kiyomoto | H04W 88/085 |
| | | | 455/517 |
| 2009/0147706 A1 | 6/2009 | Yu et al. | |
| 2009/0149198 A1* | 6/2009 | Nam | G01S 5/0294 |
| | | | 455/456.2 |
| 2010/0273492 A1* | 10/2010 | Liu | H04B 7/022 |
| | | | 455/446 |
| 2010/0296487 A1* | 11/2010 | Karaoguz | H04W 36/04 |
| | | | 370/332 |
| 2011/0085506 A1 | 4/2011 | Lee et al. | |
| 2011/0201268 A1 | 8/2011 | He et al. | |
| 2011/0212681 A1* | 9/2011 | Yamamoto | H04B 7/2041 |
| | | | 455/3.01 |
| 2011/0243201 A1* | 10/2011 | Phillips | H01Q 1/007 |
| | | | 375/219 |
| 2011/0249597 A1* | 10/2011 | Papadopoulos | H04L 5/0023 |
| | | | 370/280 |
| 2011/0269459 A1* | 11/2011 | Koo | H04W 24/10 |
| | | | 455/434 |
| 2011/0312359 A1* | 12/2011 | Kolding | H04W 52/02 |
| | | | 455/509 |
| 2011/0319066 A1* | 12/2011 | Chou | H04W 36/0077 |
| | | | 455/422.1 |
| 2012/0190375 A1 | 7/2012 | Gu et al. | |
| 2012/0311072 A1* | 12/2012 | Huang | H04L 69/14 |
| | | | 709/217 |
| 2013/0017852 A1* | 1/2013 | Liu | H04W 88/085 |
| | | | 455/509 |
| 2013/0198362 A1* | 8/2013 | Abuelsaad | H04L 41/24 |
| | | | 709/224 |
| 2013/0250908 A1* | 9/2013 | Bach | H04W 52/0206 |
| | | | 370/331 |
| 2013/0301415 A1* | 11/2013 | Archer | H04W 28/08 |
| | | | 370/235 |
| 2014/0031049 A1* | 1/2014 | Sundaresan | H04W 16/02 |
| | | | 455/447 |
| 2014/0161447 A1* | 6/2014 | Graves | H04Q 11/0005 |
| | | | 398/48 |
| 2015/0189586 A1* | 7/2015 | Westberg | H04W 28/0221 |
| | | | 370/311 |
| 2015/0327078 A1* | 11/2015 | Zhu | H04W 16/28 |
| | | | 370/328 |

* cited by examiner

MOBILE COMMUNICATION SYSTEM, DIGITAL UNIT, AND METHOD OF ESTABLISHING JOINT TRANSMISSION AREA IN THE SYSTEM

CROSS REFERENCE TO RELATED APPLICATIONS

This application is a National Stage Patent Application of PCT International Patent Application No. PCT/KR2013/007910 (filed on Sep. 2, 2013) under 35 U.S.C. § 371, which claims priority to Korean Patent Application No. 10-2012-0148786 (filed on Dec. 18, 2012), the teachings of which are incorporated herein in their entireties by reference.

TECHNICAL FIELD

The present disclosure relates to a mobile communication system, a digital unit, and a method of establishing a joint transmission area in the system.

BACKGROUND ART

A typical communication base station includes a digital unit and a radio unit, which are installed in a single physical system. Such a system has limitations in cell design optimization because it is required to deploy the base station including all processing units in each cell. To solve this problem, a plurality of antennas is connected to one base station for forming a cell in a desired design.

This may enable efficient cell design, but it is difficult to maximize system capacity. Accordingly, there is a demand for developing new base station structures and methods of transmission in order to maximize radio capacity. Joint transmission has been proposed and used to allow at least two neighboring base stations to simultaneously send the same signal or data to a terminal. Using joint transmission, signal quality can be improved by about twice, or spatiotemporal channel coding gain can be attained.

Although joint transmission improves terminal quality, it uses a large amount of radio resources because all of base stations performing joint transmission require resources.

Consequently, overall performance may be degraded when the number of users increases due to lack of radio resources to be used.

The above information disclosed in this Background section is only for enhancement of understanding of the background of the invention and therefore it may contain information that does not form the prior art that is already known in this country to a person of ordinary skill in the art.

DISCLOSURE

Technical Problem

The embodiments of the present disclosure have been made in an effort to provide a mobile communication system, a digital unit, and a method of establishing a joint transmission area in the system for optimizing performance according to variation in the number of users by defining a joint transmission area differently depending on network load.

Technical Solution

An exemplary embodiment of the present disclosure provides a mobile communication system including a digital unit, a plurality of radio units. The digital unit is connected to a core system and processes radio digital signals. The plurality of radio units are physically separated from the digital unit. The plurality of radio units convert and amplify a digital signal received from the digital unit, send the digital signal to a terminal, receive a signal sent from the terminal, and pass it to the digital unit. When the digital unit determines that the terminal is located in a joint transmission area based on signal strength values received from two of the radio units and the transmission powers of the two radio units, the digital unit adjusts the joint transmission area depending on the load on the network to which the two radio units belong in order to allow the two radio units to perform a joint transmission function to send the same signal or a spatiotemporally coded signal of the same data to the terminal.

When the load on the network including the two radio units is comparatively low, the digital unit may establish a joint transmission area wider than a joint transmission area set when the network load is high.

The network load may vary according to a time of day.

The hours of a day may be divided into off-peak hours when the load is low, peak hours when the load is comparatively high, and normal hours when the load is higher than the off-peak hours and lower than the peak hours. The joint transmission area for the off-peak hours is established wider than joint transmission areas established for the peak hours and the normal hours.

The network load may be an integrated load that is set based on load information collected from base stations.

The digital unit may determine whether the terminal is located in the joint transmission area or not using the equation $|B-(X-Y)-A| \leq T$ (the unit is dB), where X and Y represent the transmission powers of the two radio units, X being greater than Y, A and B represent the signal strength values received from the two radio units, A being the signal strength value received from the radio unit whose transmission power is X and B being the signal strength value received from the radio unit whose transmission power is Y, and T represents a parameter of joint transmission, which is an integer equal to or greater than 0. The digital unit may adjust the parameter T of joint transmission depending on the network load.

Another exemplary embodiment of the present disclosure provides a digital unit physically separated from a plurality of radio units and processes radio signals from the radio units. The digital unit may include a receiver, a determination unit, and a processor. The receiver is configured to receive, from two of the radio units, values of strength of an uplink signal received by the two radio units from a terminal. The determination unit is configured to establish a joint transmission area corresponding to the time of receipt of a radio resource scheduling request from the terminal and configured to determine whether the terminal is located in the joint transmission area or not. The joint transmission allows the two radio units to simultaneously send the same signal or a spatiotemporally coded signal of the same data to the terminal. The processor is configured to perform radio resource scheduling on the terminal in order to allow the two radio units to perform the joint transmission function for the terminal when the determination unit determines that the terminal is located in the joint transmission area.

The digital unit may further include a storage unit configured to store load-dependent time information and load-dependent parameter values of joint transmission. The determination unit determines whether the terminal is located in the joint transmission area or not, by selecting corresponding hours from hours stored in the storage unit according to the time of receipt of the radio resource scheduling request from the terminal and extracting the parameter of joint transmission based on the corresponding hours.

The digital unit may further include a time provision unit configured to provide the current time. The determination unit receives time information from the time provision unit upon receiving a radio resource scheduling request from the terminal.

When the corresponding hours are off-peak hours of low load, the determination unit may establish a joint transmission area for the off-peak hours wider than joint transmission areas for peak hours of high load.

Yet another exemplary embodiment of the present disclosure provides a digital unit physically separated from a plurality of radio units installed in a service area and processes radio signals from the radio units. The digital unit includes a receiver, a load monitoring unit, and a determination unit. The receiver is configured to receive, from two of the radio units, values of strength of an uplink signal received by the two radio units from a terminal. The load monitoring unit is configured to collect load information from the radio units and is configured to calculate an integrated load based on the collected load information. The determination unit is configured to establish a joint transmission area corresponding to an integrated load value provided from the load monitoring unit upon receiving a radio resource scheduling request from the terminal and configured to determine whether the terminal is located in the joint transmission area or not. The joint transmission allows the two radio units to simultaneously send the same signal or a spatiotemporally coded signal of the same data to the terminal. When the determination unit determines that the terminal is located in the joint transmission area, the processor is configured to perform radio resource scheduling on the terminal in order to allow the two radio units to perform the joint transmission function for the terminal.

The digital unit may further include a storage unit configured to store load-dependent parameter values of joint transmission. The determination unit determines whether the terminal is located in the joint transmission area or not, by extracting a corresponding parameter of joint transmission from the storage unit based on the load value provided from the load monitoring unit.

When the load value provided from the load monitoring unit is comparatively low, the digital unit may establish a joint transmission area wider than that established when the load value provided from the load monitoring unit is comparatively high.

A further exemplary embodiment of the present disclosure provides a method of establishing a joint transmission area by a digital unit. The joint transmission allows two radio units to simultaneously send the same signal or a spatiotemporally coded signal of the same data to the terminal. The digital unit is physically separated from a plurality of radio units installed in a service area and processes radio signals from the radio units. The method may include receiving a radio resource scheduling request from a terminal, determining whether the network load is comparatively low, when the network load is comparatively low, establishing a joint transmission area wider than that established when the network load is comparatively high; and when the network load is comparatively high, establishing a joint transmission area narrower than a joint transmission area established when the network load is comparatively low.

The determining of whether the network load is low or not includes determining whether hours associated with the network load corresponds to hours of low load.

The determining of whether the network load is low or not includes setting an integrated load set based on load information collected from base stations and determining the integrated load is comparatively low.

Hours of a day may be divided into off-peak hours when the load is comparatively low, peak hours when the load is comparatively high, and normal hours when the load is higher than the off-peak hours and lower than the peak hours, and the joint transmission area for the off-peak hours may be established wider than joint transmission areas for the peak hours and the normal hours.

Advantageous Effects

According to at least one embodiment of the present disclosure, performance can be optimized according to variation in the number of users by defining a joint transmission area differently depending on a time-dependent network load.

Furthermore, performance can be optimized according to variation in the number of users by establishing a joint transmission area differently depending on load information collected from base stations.

MODE FOR INVENTION

In the following detailed description, only certain exemplary embodiments of the present disclosure have been shown and described, simply by way of illustration. As those skilled in the art would realize, the described embodiments may be modified in various different ways, all without departing from the spirit or scope of at least one embodiment of the present disclosure. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components and combinations thereof.

In the specification, a terminal may indicate a mobile station (MS), a mobile terminal (MT), a subscriber station (SS), a portable subscriber station (PSS), user equipment (UE), an access terminal (AT), etc., and may include all or some of the functions of the MS, MT, SS, PSS, UE, AT, etc.

In the specification, a base station (BS) may indicate an access point (AP), a radio access station (RAS), a node B (NodeB), an evolved node B (eNodeB), a base transceiver station (BTS), a mobile multihop relay base station (MMR-BS), etc., and may include all or some of the functions of the AP, RAS, NodeB, eNodeB, BTS, MMR-BS, etc.

First of all, a network structure according to an exemplary embodiment of the present disclosure will be described with reference to FIG. 1.

Figure 1:
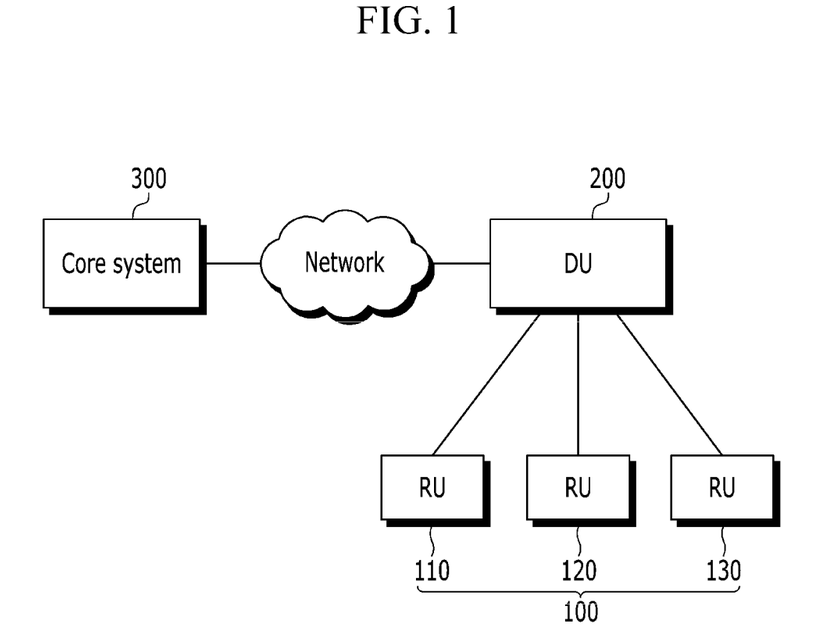
FIG. 1 is a schematic block diagram of a network according to an exemplary embodiment of the present disclosure.

FIG. 1 is a schematic block diagram of a network according to an exemplary embodiment of the present disclosure.

Referring to FIG. 1, a network according to an exemplary embodiment of the present invention includes a radio unit (hereinafter, "RU") 100, a digital unit (hereinafter, "DU") 200, and a core system 300. The RU 100 and the DU 200 constitute a signal processing system for wireless communication.

The radio unit 100 is a part that processes radio signals. The radio unit 100 converts a digital signal received from the digital unit 200 into a radio frequency (RF) signal depending upon the frequency band. The radio unit 100 amplifies the RF signal. Then, the radio unit 100 sends the amplified RF signal to a terminal using an antenna. The radio unit 100 receives a signal from the terminal using an antenna, processes the signal, and passes it to the DU 100.

The RU 100 includes a plurality of RUs 110, 120, and 130 that are connected to the DU 200. Each RU 100 is installed in a service area, i.e., a cell. The RU 100 and the DU 200 may be connected by an optical cable.

The DU 200 encodes and decodes a radio digital signal. The DU 200 is connected to the core system 300. The DU 200 is a virtualized base station. Unlike the RU 100, the DU 200 is not installed in a service area. The DU 200 is a server centralized mainly at a predetermined telecommunication service facility. The DU 200 sends signals to and receives signals from a plurality of RUs 100.

A typical communication base station includes processing units corresponding to the RU 100 and the DU 200 within a single physical system. Such a physical system is installed in a service area. On the contrary, in a system according to an exemplary embodiment of the present disclosure, the RU 100 and the DU 200 are physically separated, and only the RU 100 is installed in a service area.

The core system 300 handles a connection between the DU 200 and an external network. The core system 300 includes a switching unit (not shown).

Figure 2:
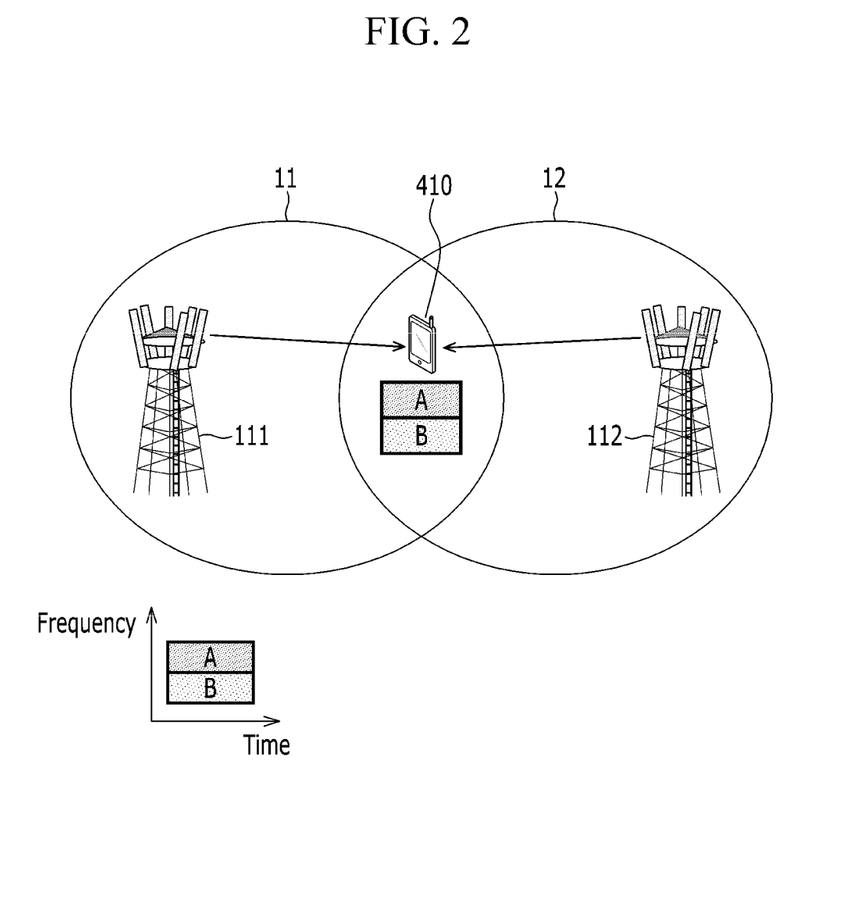
FIG. 2 is a conceptual diagram for explaining joint transmission according to an exemplary embodiment of the present disclosure.

FIG. 2 is a conceptual diagram for explaining joint transmission according to an exemplary embodiment of the present disclosure.

Referring to FIG. 2, RUs 111 and 112 are deployed in Cell1 11 and Cell2 12, respectively. RU 111 and RU 112 send the same signal or a spatiotemporally coded signal of the same data to a terminal 410 located in a cell boundary region by using joint transmission, thereby improving transmission efficiency.

In this case, signal quality may be increased by about twice (to 3 dB), or a spatiotemporal channel coding gain may be attained.

In order to perform joint transmission as above, it is required to determine whether the terminal 410 is located in the boundary region of the two cells 11 and 12. When the DU 200 receives a signal such as a pilot signal that the RUs 111 and 112 had received from the terminal 410, the DU 200 performs such determination by comparing the signal strength at the two RUs 111 and 112.

Figure 3:
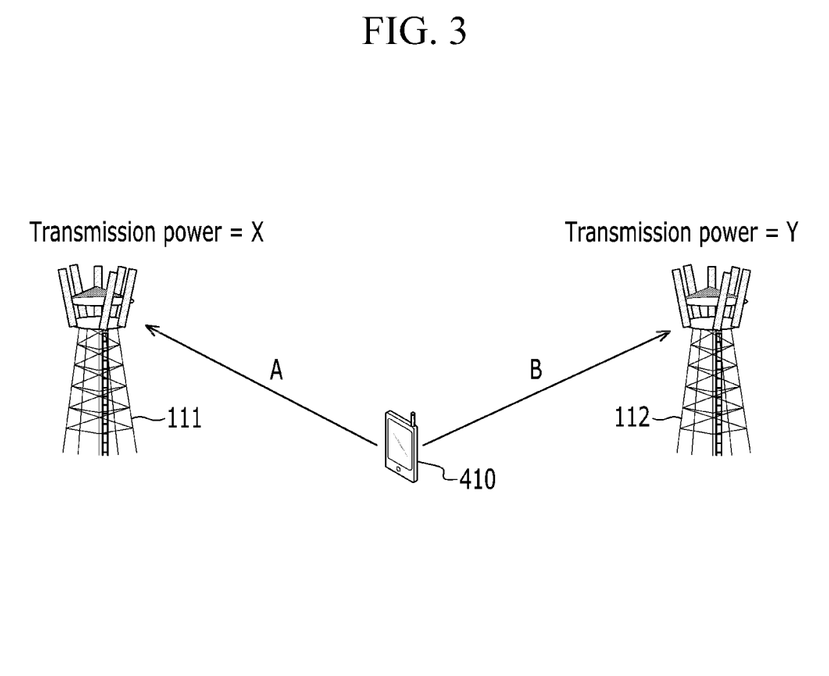
FIG. 3 is a view showing an example of acquisition of information regarding whether a terminal is located in a joint transmission area or not, according to an exemplary embodiment of the present disclosure.

FIG. 3 is a view showing an example of acquisition of information regarding whether a terminal is located in a joint transmission area or not, according to an exemplary embodiment of the present disclosure.

Referring to FIG. 3, it is assumed that the transmission power of the RU 111 is X, the transmission power of the RU 112 is Y, and the DU 200 is aware of the transmission powers X and Y.

The two RUs 111 and 112 measure the strength of an uplink signal received from the terminal 410 and provide the measurements to the DU 200. Then, the DU 200 determines whether the terminal 410 is located in a joint transmission area or not, based on the signal strength value (A) received from the RU 111, the signal strength value (B) received from the RU 112, and the transmission powers X and Y of the two RUs 111 and 112.

That is, as shown in the following equation 1, if the absolute value of the result of subtracting the difference between the transmission powers X and Y from the difference between the signal strength value (B) and the signal strength value (A) is equal to or less than a parameter (T) of joint transmission, it is determined that the terminal 410 is located in the joint transmission area.

$$|B-(X-Y)-A|\leq T \text{ (the unit is dB)}, \quad \text{[Equation 1]}$$

where T is an integer equal to or greater than 0.

As shown in Equation 1, if the parameter T is small, the boundary region between the cells 11 and 12 where joint transmission occurs is comparatively small, and if the parameter T is large, the boundary region between the cells 11 and 12 where joint transmission occurs is comparatively large.

The above-mentioned joint transmission is advantageous when the loads on the RUs 111 and 112 are low, because both of the RUs 111 and 112 have to simultaneously consume resources for one terminal 410. That is, if the loads on the RUs 111 and 112 are high, it may be very difficult to allocate resources for joint transmission.

Particularly, the larger the parameter T of joint transmission in Equation 1, the larger the amount of resources to be consumed by the two RUs 111 and 112. Thus, if the parameter T is comparatively large, the loads on the RUs 111 and 112 need to be low to allow for joint transmission.

Accordingly, in the exemplary embodiment of the present disclosure, when the loads on the RUs 111 and 112 are low, the parameter T of joint transmission is set as high as possible to improve the signal quality of the terminal 410. On the other hand, when the load is high, the parameter T is set low so that resources are allocated to the cell's own terminals, rather than to the terminal 410 that performs joint transmission, thereby improving network capacity.

In this way, an optimum joint transmission area can be defined depending on network load by adjusting the boundary region where joint transmission occurs, depending on the network load, i.e., the loads on the RUs 111 and 112. Hence, the exemplary embodiment of the present disclosure offers optimum performance in response to increment and/or decrement in the number of terminals, i.e., users.

Meanwhile, there may be a variety of methods of taking the network load, i.e., the loads on the RUs 111 and 112, into consideration. The exemplary embodiment of the present disclosure will be described with respect to two of these methods.

In the first method, the hours of day are classified into off-peak hours, peak hours, and normal hours. The off-peak hours may denote hours when the load is comparatively low, the peak hours may denote hours when the load is comparatively high, and the normal hours may denote hours when the load is higher than the off-peak hours and lower than the peak hours. The parameter T of joint transmission is set with a comparatively high value for the off-peak hours when the load is low. The parameter T is set with a comparatively low value for the peak hours and normal hours when the load is not low. The hours when the load is not comparatively low may be divided into off-peak hours and normal hours to apply different parameters T to the off-peak hours and the normal hours. For example, the parameter T for the normal hours may be set with a predetermined value lower than the parameter for the off-peak hours and higher than the parameter T for the peak hours.

In the second method, information on loads on base stations, i.e., the RUs 111 and 112, is collected, and the parameter T of joint transmission is set depending on the amount of an integrated load set based on the collected load information. That is, if it is determined that the amount of the integrated load is larger than a threshold value and therefore deemed high, the parameter T is set with a comparatively low value. On the other hand, if it is determined that the amount of the integrated load is less than the threshold value and therefore deemed low, the parameter T is set with a comparatively high value.

Hereinafter, a method of defining a joint transmission area according to a first exemplary embodiment of the present disclosure (e.g., the first method) will be described.

Figure 4:
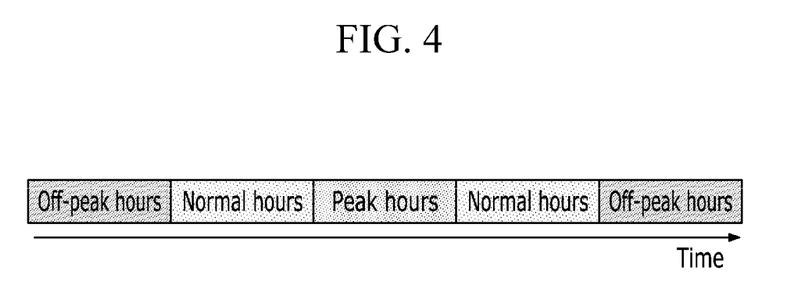
FIG. 4 is a view showing how the amount of load is classified according to the time of day, which is used in the method of establishing a joint transmission area according to the first exemplary embodiment of the present disclosure.

FIG. 4 is a view showing how the amount of load is classified according to the time of day, which is used in the method of establishing a joint transmission area according to the first exemplary embodiment of the present invention.

Referring to FIG. 4, twenty-four hours of a day or predetermined unit hours of a day may be divided into off-peak hours, peak hours, and normal hours.

The off-peak hours refer to the hours when the load is comparatively low because there are only few users or terminals in the RUs 111 and 112.

The peak hours refer to the hours when the load is comparatively high because there are many users or terminals in the RUs 111 and 112.

The normal hours refer to the hours when the load is higher than the off-peak hours and lower than the peak hours.

A reference value of network load used for differentiation between the above-described off-peak hours, peak hours, and normal hours can be set through various types of tests. A detailed description of this will be omitted so as not to obscure the gist of the embodiments of the present disclosure.

Moreover, different periods may be set by the days of the week, the months, or the seasons, rather than dividing a day into the above-described off-peak hours, peak hours, and normal hours.

Figure 5:
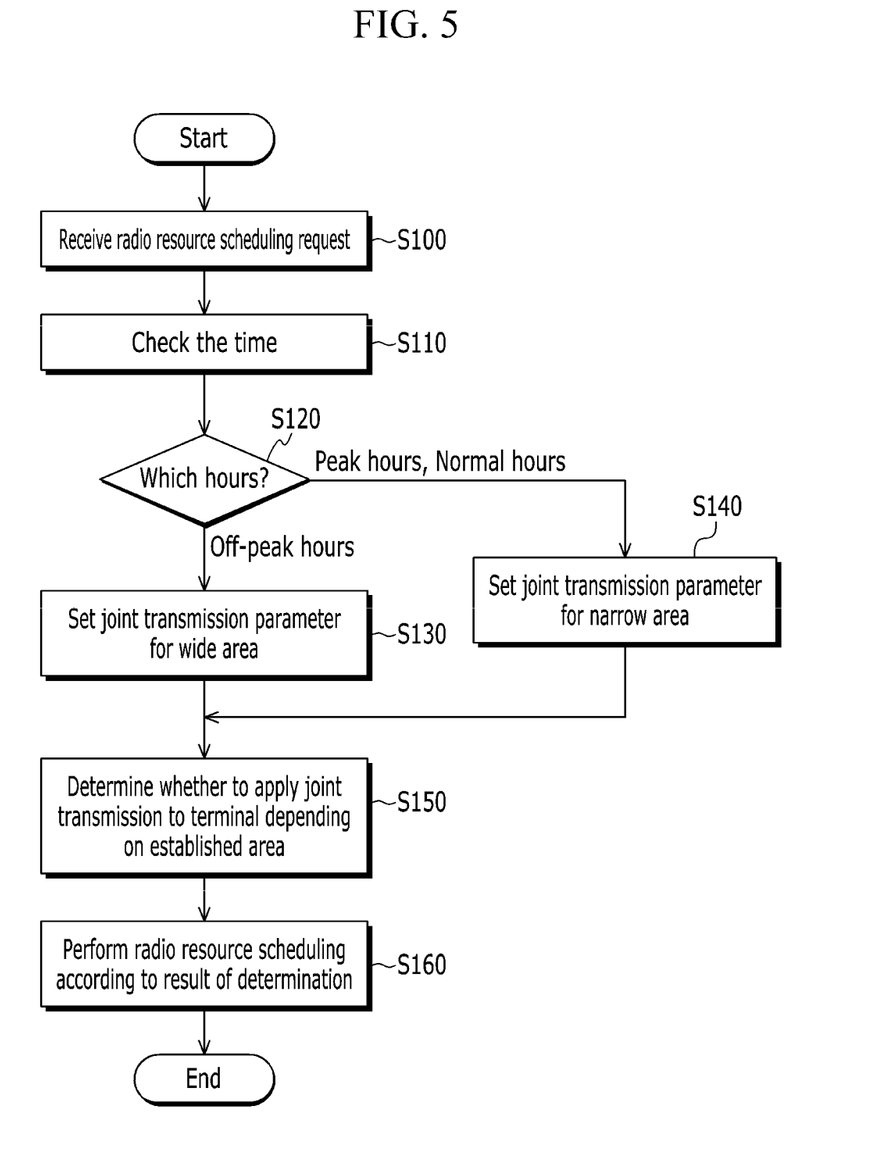
FIG. 5 is a flowchart of a method of establishing a joint transmission area according to the first exemplary embodiment of the present disclosure.

FIG. 5 is a flowchart of a method of establishing a joint transmission area according to the first exemplary embodiment of the present disclosure.

Referring to FIG. 5, the DU 200 receives a radio resource scheduling request from the terminal 410 through the RUs 111 and 112 (S100).

Next, the DU 200 checks the time of receipt of the radio resource scheduling request (S110). The time of receipt may be exact time that is synchronized with time information obtained by the mobile communication system from a source server (not shown) for providing standard time.

Afterwards, the DU 200 determines whether the time checked in the step S110 corresponds to hours of high network load or hours of low network load (S120).

If the corresponding hours are off-peak hours of low network load, a large amount of radio resources can be allocated. Thus, the parameter T of joint transmission is set with a comparatively high value to provide a wide joint transmission area (S130). The parameter T may be preset according to the time of day.

On the other hand, if the corresponding hours are peak hours of high network load or normal hours, it is difficult to allocate a large amount of radio resources. Thus, the parameter T of joint transmission is set with a comparatively low value to provide a narrow joint transmission area (S140). The parameter T may also be preset according to the time of day.

As described above, the joint transmission area is set differently according to the time of day depending on load. That is, the parameter T of joint transmission varies according to the time of day. Hence, it determines whether to apply joint transmission to the terminal 410 or not according to Equation 1 (S150).

According to the result of determination in the step S150, the DU 200 performs radio resource scheduling on the terminal 410 (S160). That is, if the terminal 410 belongs to the joint transmission area established in the step S150, radio resources are allocated to enable the RUs 111 and 112 to simultaneously send data. On the other hand, if the terminal 410 does not belong to the joint transmission area, radio resources are allocated to allow only one connected to the terminal 410 between the RU 111 and the RU 112 to send data.

For example, although the terminal 410 may not belong to the narrow joint transmission area in the peak hours, it may belong to the wide joint transmission area in the off-peak hours. Accordingly, while joint transmission is not applied to the terminal 410 in the peak hours when there are insufficient radio resources, it is applied to the terminal 410 in the off-peak hours when there are sufficient radio resources, thereby allowing for flexible radio resource scheduling depending on network load.

Figure 6:
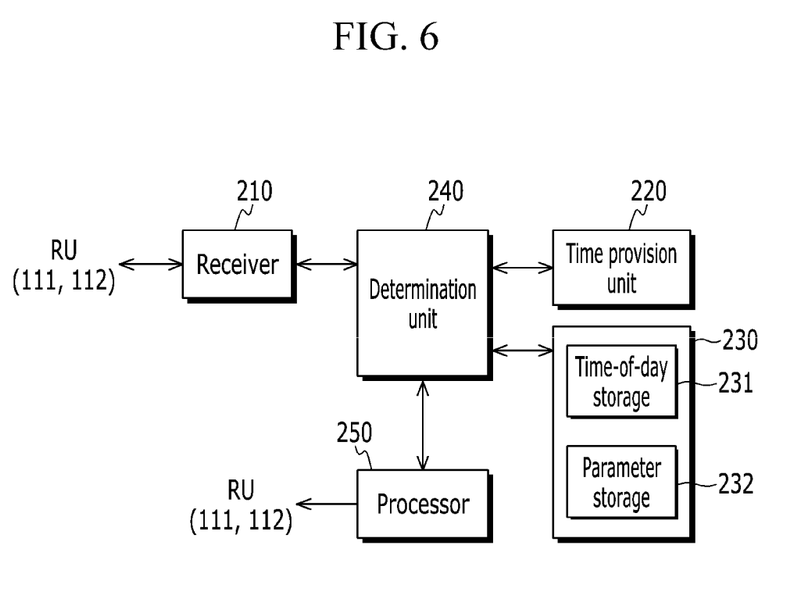
FIG. 6 is a block diagram of a DU according to the first exemplary embodiment of the present disclosure.

FIG. 6 is a block diagram of the DU 200 according to the first exemplary embodiment of the present disclosure.

As shown in FIG. 6, the DU 200 includes a receiver 210, a time provision unit 220, a storage unit 230, a determination unit 240, and a processor 250.

The receiver 210 receives a radio signal from each of the RUs 111 and 112. The radio signal includes information on a value of strength of an uplink signal received by the RUs 111 and 112 from the terminal 410.

The time provision unit 220 provides the current time.

The storage unit 230 stores load-dependent time-of-day information and load-dependent parameter values of joint transmission. To this end, the storage unit 230 includes a time-of-day information storage 231 that stores load-dependent time-of-day information, and a parameter storage 232 that stores load-dependent parameter values T of joint transmission.

The time-of-day information storage 231 stores information according to the time of day, i.e., off-peak hours, peak hours, and normal hours. Accordingly, the time-of-day information storage 231 may be configured to output information on the hours corresponding to an input time, that is, the off-peak hours, peak hours, or normal hours.

The parameter storage 232 stores different parameter values T for different loads. For example, the parameter storage 232 may store a parameter value T for a load greater than a reference value and a parameter value T for a load less than the reference value. Alternatively, the parameter storage 232 may store a parameter value T for the off-peak hours and a parameter value T for the normal hours. Alternatively, the parameter storage 232 may store different parameter values T for the off-peak hours, peak hours, and normal hours, respectively. Various modifications can be made according to exemplary embodiments.

The present exemplary embodiment will be described on the assumption that the parameter storage 232 stores a parameter value $T_{off-peak}$ for the off-peak hours and a parameter value $T_{peak}$ for the normal hours.

Upon receiving a radio resource scheduling request for the terminal 410 from the RUs 111 and 112 through the receiver 210, the determination unit 240 receives time information from the time provision unit 220 and extracts the hours corresponding to the current time and the parameter T of joint transmission for the corresponding hours from the storage unit 230, based on the provided time information. Then, the determination unit 240 determines whether the terminal 410 is located in a joint transmission area or not, according to Equation 1 based on the signal strength values received through the receiver 210 and the transmission powers of the RUs 111 and 112.

The processor 250 performs radio resource scheduling on the terminal 410, as determined by the determination unit 240. That is, radio resource scheduling is performed according to the result of determination by the determination unit 240 as to whether the terminal 410 is located in the joint transmission area or not.

As discussed above, the first exemplary embodiment of the present disclosure offers optimum performance because joint transmission can be adaptively applied depending on network load by establishing an optimum joint transmission area depending on load and by varying the joint transmission area according to the time of day.

Next, a method of establishing a joint transmission area according to a second exemplary embodiment of the present disclosure is applied will be described.

Figure 7:
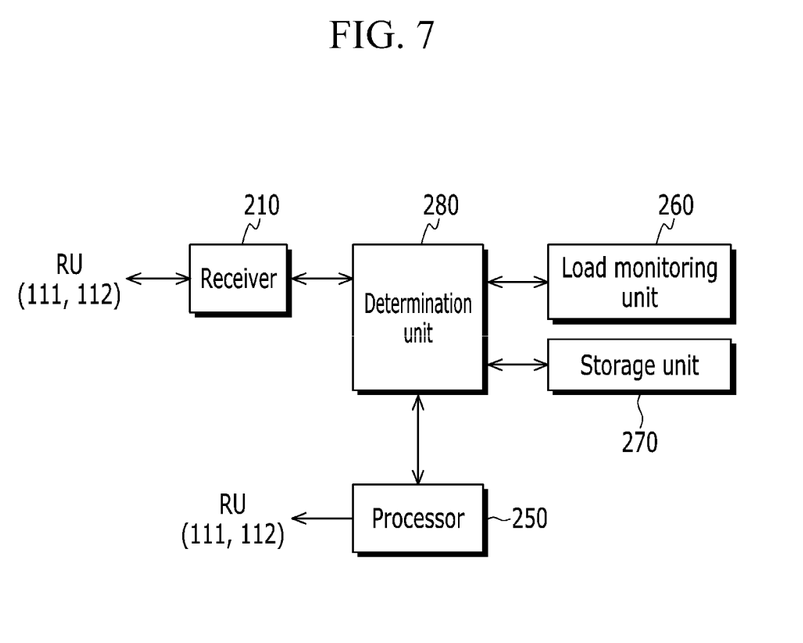
FIG. 7 is a block diagram of a DU according to a second exemplary embodiment of the present disclosure.

FIG. 7 is a block diagram of the DU 200 according to the second exemplary embodiment of the present disclosure. The DU 200 according to the second exemplary embodiment of the present disclosure is configured in a similar way to the DU 200 according to the first exemplary embodiment explained with reference to FIG. 6. Accordingly, only different components from those of the DU 200 according to the first exemplary embodiment will be described, and like reference numerals will be used to describe like elements.

As shown in FIG. 7, the DU 200 includes a receiver 210, a load monitoring unit 260, a storage unit 270, a determination unit 280, and a processor 250.

The receiver 210 receives a radio signal from the RUs 111 and 112. The radio signal includes information on a value of strength of an uplink signal received by the RUs 111 and 112 from the terminal 410.

The load monitoring unit 260 collects load information from the RUs 111 and 112. The load monitoring unit 260 calculates an integrated load based on the collected load information. The load monitoring unit 260 may collect load information from all RUs within the cells 11 and 12 and all RUs within neighboring cells. In this case, the integrated load may be calculated based only on the load information of the RUs 111 and 112 within the cells 11 and 12 that may apply joint transmission to the terminal 410. The integrated load refers to an integrated value of different loads on the RUs 111 and 112. The integrated load may be applied according to a typical method, so a detailed description thereof will be omitted.

Although the second exemplary embodiment of the present disclosure is described with an example where the load monitoring unit 260 is included in the DU 200, the cells 111 and 112 may be individually controlled by two different DUs. Taking this into account, the load monitoring unit 260 may be configured as a separate component, apart from the DU 200, so as to collect information on the loads on the RUs 111 and 112.

The storage unit 270 stores different parameter values T for different loads. For example, the storage unit 270 may store a parameter value T for a load greater than a reference value and a parameter value T for a load less than the reference value. The parameter value T for a load greater than the reference value is less than the parameter value T for a load less than the reference value.

Upon receiving a radio resource scheduling request for the terminal 410 from the RUs 111 and 112 through the receiver 210, the determination unit 280 receives the integrated load value from the load monitoring unit 260 and extracts the parameter T of joint transmission from the storage unit 230 according to the result of comparison between the integrated load value and the reference value. Then, the determination unit 280 determines whether the terminal 410 is located in a joint transmission area or not, according to Equation 1 based on the signal strength values received through the receiver 210 and the transmission powers of the RUs 111 and 112.

The processor 250 performs radio resource scheduling on the terminal 410, as determined by the determination unit 280. That is, radio resource scheduling is performed according to the result of determination by the determination unit 280 as to whether the terminal 410 is located in the joint transmission area or not.

Figure 8:
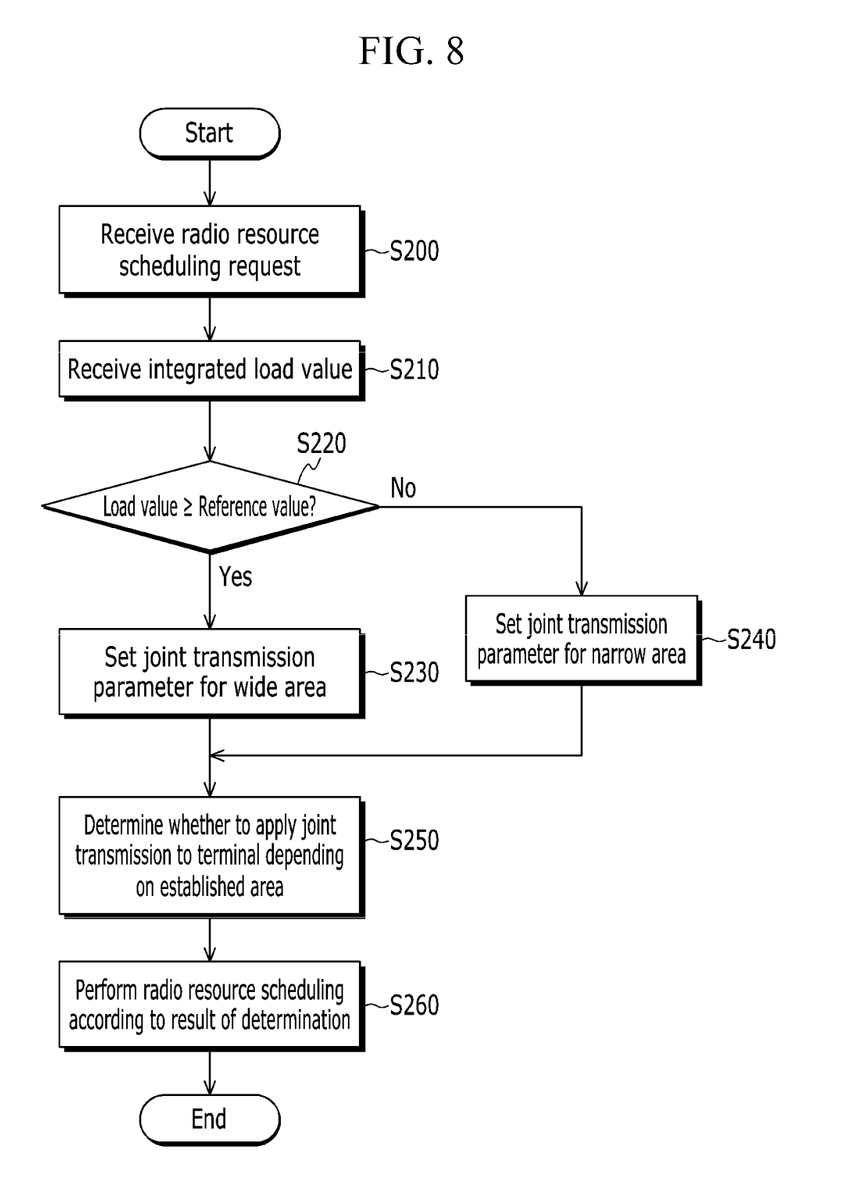
FIG. 8 is a flowchart of a method of establishing a joint transmission area according to the second exemplary embodiment of the present disclosure.

FIG. 8 is a flowchart of a method of setting a joint transmission area according to the second exemplary embodiment of the present disclosure.

Referring to FIG. 8, the DU 200 receives a radio resource scheduling request from the terminal 410 through the RUs 111 and 112 (S200).

Next, the DU 200 receives an integrated load value from the load monitoring unit 220 (S210).

Then, the DU 200 compares the integrated load value with a reference value (S220). If the integrated load value is greater than the reference value and represents a high load, it may be difficult for the corresponding RUs 111 and 112 to allocate many radio resources. Thus, the parameter T of joint transmission is set with a comparatively low value to provide a narrow joint transmission area (S230). The parameter T may be set through various types of tests in a mobile communication system.

If the integrated load value is less than the reference value and represents a low load, it may be possible for the corresponding RUs 111 and 112 to allocate many radio resources. Thus, the parameter T of joint transmission is set with a comparatively high value to provide a wide joint transmission area (S240). The parameter T may be set through various types of tests in a mobile communication system.

As above, the joint transmission area is established differently depending on the loads on the RUs 111 and 112, that is, the parameter T of joint transmission varies depending on the integrated load on the RUs 111 and 112.

Hence, whether to apply joint transmission to the terminal 410 or not is determined according to Equation 1 (S250).

According to the result of determination in the step S150, the DU 200 performs radio resource scheduling on the terminal 410 (S260). That is, if the terminal 410 belongs to the joint transmission area established in the step S250, radio resources are allocated to allow the RUs 111 and 112 to simultaneously send data. On the other hand, if the terminal 410 does not belong to the joint transmission area, radio resources are allocated to allow only one connected to the terminal 410 between the RU 111 and RU 112 to send data.

As discussed above, the second exemplary embodiment of the present disclosure offers optimum performance because joint transmission can be adaptively applied depending on network load by establishing an optimum joint transmission area depending on load and by varying the joint transmission area depending on load information collected from the RUs 111 and 112. While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A mobile communication system comprising:
a digital unit connected to a core system and configured to process radio digital signals; and
a plurality of radio units physically separated from the digital unit, configured to convert and amplify a digital signal received from the digital unit, configured to send the amplified signal to a terminal, configured to receive a signal sent from the terminal, and configured to pass the received signal to the digital unit,
wherein, when the digital unit determines that the terminal is located in a joint transmission area based on signal strength values received from two of the radio units and transmission powers of the two radio units, the digital unit adjusts the joint transmission area depending on load on a network including the two radio units, in order to allow the two radio units to perform a joint transmission function to send at least one of a same signal and a spatiotemporally coded signal of same data to the terminal.

2. The mobile communication system of claim 1, wherein lower the load on the network is the wider a joint transmission area set by the digital unit is.

3. The mobile communication system of claim 1, wherein the network load varies according to a time of day.

4. The mobile communication system of claim 2, wherein:
the hours of a day are divided into off-peak hours when the load is lower than the first threshold, peak hours when the load is higher than the second threshold, and normal hours when the load is higher the first threshold and lower than the second threshold; and
the joint transmission area is set to be wider for the off-peak hours, as compared to a joint transmission area set for the peak hours and the normal hours.

5. The mobile communication system of claim 1, wherein the network load is determined based on a load value that integrally is set based on load information collected from base stations.

6. The mobile communication system of claim 4, wherein:
the digital unit determines whether the terminal is located in the joint transmission area-using an equation $|B-(X-Y)-A|\leq T$, wherein X and Y represent the transmission powers of the two radio units, X is greater than Y, A and B represent the signal strength values received from the two radio units, A is a signal strength value received from a radio unit whose transmission power is X, B is a signal strength value received from a radio unit whose transmission power is Y, and T represents a parameter of joint transmission, which is an integer equal to or greater than 0; and
the digital unit adjusts the parameter T of joint transmission depending on network load.

7. A digital unit physically separated from a plurality of radio units installed in a service area and for processing radio signals radio signals from the radio units, the digital unit comprising:
a receiver configured to receive, from two of the radio units, information on values of strength of an uplink signal received by the two radio units from a terminal;
a determination unit configured to set a joint transmission area corresponding to a time of receipt of a radio resource scheduling request from the terminal and determines whether the terminal is located in a joint transmission area, wherein joint transmission allows the two radio units to simultaneously send at least one of a same signal and a spatiotemporally coded signal of same data to the terminal; and
a processor configured to perform radio resource scheduling on the terminal to allow the two radio units to perform the joint transmission for the terminal when the determination unit determines that the terminal is located in the joint transmission area,
wherein when the determination unit determines that the terminal is located in the joint transmission area, the processor adjusts the joint transmission area depending on load on a network including the two radio units in order to allow the two radio units to perform the joint transmission.

8. The digital unit of claim 7, further comprising:
a storage unit configured to store load-dependent time information and load-dependent parameter values of joint transmission,
wherein the determination unit selects one of hours stored in the storage unit corresponding to the time of receipt of the radio resource scheduling request from the terminal, extracts the parameter of joint transmission based on the selected hour, and determines whether the terminal is located in the joint transmission area based on the extracted parameter.

9. The digital unit of claim 8, further comprising a time provision unit configured to provide the current time,
wherein the determination unit receives time information from the time provision unit upon receiving a radio resource scheduling request from the terminal.

10. The digital unit of claim 9, wherein, when the selected hours are off-peak hours of load lower than a first threshold, the determination unit establishes a joint transmission area for the off-peak hours to be wider than a joint transmission area set for peak hours of load higher than a second threshold.

11. A digital unit physically separated from a plurality of radio units installed in a service area and for processing radio signals from the radio units, the digital unit comprising:
- a receiver configured to receive, from two of the radio units, information on values of strength of an uplink signal received by the two radio units from a terminal;
- a load monitoring unit configured to collect load information from the radio units and configured to calculate an integrated load value based on the collected load information;
- a determination unit configured to set a joint transmission area corresponding to the integrated load value provided from the load monitoring unit upon receiving a radio resource scheduling request from the terminal and configured to determine whether the terminal is located in the joint transmission area or not wherein joint transmission allows the two radio units to simultaneously send at least one of a same signal and a spatiotemporally coded signal of same data to the terminal; and
- a processor configured to perform radio resource scheduling on the terminal to allow the two radio units to perform the joint transmission function for the terminal when the determination unit determines that the terminal is located in the joint transmission area
- wherein when the determination unit determines that the terminal is located in the joint transmission area, the processor adjusts the joint transmission area depending on load on a network including the two radio units in order to allow the two radio units to perform the joint transmission.

12. The digital unit of claim 11, further comprising:
- a storage unit configured to store load-dependent parameter values of joint transmission,
- wherein the determination unit determines whether the terminal is located in the joint transmission area or not, by extracting a corresponding parameter of joint transmission from the storage unit based on the load value provided from the load monitoring unit.

13. The digital unit of claim 11, wherein the lower the load value provided from the load monitoring unit is, the wider a joint transmission area established by the digital unit is.

14. A method of establishing a joint transmission area by a digital unit that is physically separated from a plurality of radio units and processes radio signals wherein joint transmission allows two radio units to simultaneously send at least one of a same signal and a spatiotemporally coded signal of same data to a terminal, the method comprising:
- determining whether a terminal is located in the joint transmission area based on signal strength values received from two of the radio units and transmission powers of the two radio units;
- receiving a radio resource scheduling request from the terminal;
- determining whether a network load of a network including the two radio units is lower than a predetermined threshold; and
- adjusting the joint transmission area depending on the network load,
- wherein the adjusting comprises:
- when the network load is lower than the predetermined threshold, adjusting the joint transmission area wider than that established when the network load is higher than the predetermined threshold; and
- when the network load is higher than the predetermined threshold, adjusting the joint transmission area narrower than that established when the network load is lower than the predetermined threshold.

15. The method of claim 14, wherein the determining comprises determining whether hours associated with the network load corresponds to hours of load lower than a first threshold.

16. The method of claim 14, wherein the determining comprises setting an integrated load value based on loads collected from base stations and determining whether the integrated load value is lower than the predetermined threshold.

17. The method of claim 15, wherein:
- hours of a day are divided into off-peak hours when the network load is lower than the predetermined threshold, peak hours when the network load is higher than the predetermined threshold, and normal hours when the network load is higher than the off-peak hours and lower than the peak hours; and
- a joint transmission area for the off-peak hours is established to be wider than joint transmission areas for the peak hours and the normal hours.

* * * * *